(12) United States Patent
Nachenberg (10) Patent No.: US 6,357,008 B1
(45) Date of Patent: Mar. 12, 2002

(54) DYNAMIC HEURISTIC METHOD FOR DETECTING COMPUTER VIRUSES USING DECRYPTION EXPLORATION AND EVALUATION PHASES

(75) Inventor: Carey S. Nachenberg, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 08/935,577

(22) Filed: Sep. 23, 1997

(51) Int. Cl.[7] .................................................. H04L 9/00
(52) U.S. Cl. ........................................ 713/200; 714/38
(58) Field of Search ........................... 713/200; 714/28, 714/33, 38; 364/269.4; 380/3, 4

(56) References Cited

U.S. PATENT DOCUMENTS

| | | | |
|---|---|---|---|
| 5,398,196 A | * 3/1995 | Chambers | 364/580 |
| 5,485,575 A | * 1/1996 | Chess et al. | 395/183.14 |
| 5,696,822 A | * 12/1997 | Nachenberg | 380/4 |
| 5,765,030 A | * 6/1998 | Nachenberg et al. | 395/183.09 |
| 5,826,013 A | * 10/1998 | Nachenberg | 395/186 |
| 5,842,002 A | * 11/1998 | Schnurer et al. | 395/500 |
| 5,854,916 A | * 12/1998 | Nachenberg | 395/500 |

FOREIGN PATENT DOCUMENTS

WO    WO 95/33237    12/1995

OTHER PUBLICATIONS

Veldman, "Heuristic Anti–Virus Technology", National Computer Security Association, pp. VT8–1–VT8–13, Mar. 1994.*
Solomon, "Viruses & Polymorphism", National Computer Security Association, pp. VT3–1–VT3–20, Mar. 1994.*
IBM Technical Disclosure Bulletin, vol. 34, No. 2, "Automated Program Analysis for Computer Virus Detection", pp. 415–416, Jul. 1991.*
IBM Technical Disclosure Bulletin, vol. 34, No. 2, "Artificial Immunity for Personal Computers," pp. 150–154, Jul. 1991.*
Virus Bulletin, For Programmers—The Structure of Virus Infection Part I:. COM Files, Fridrik Skulason, Jul., 1990; pp. 10–11.

* cited by examiner

*Primary Examiner*—Dieu–Minh Le
(74) *Attorney, Agent, or Firm*—Fenwick & West LLP (57) ABSTRACT

A method for detecting computer viruses comprising three phases: a decryption phase, an exploration phase, and an evaluation phase. A purpose of the decryption phase is to emulate a sufficient number of instructions to allow an encrypted virus to decrypt its viral body. A purpose of the exploration phase is to emulate at least once all sections of code within a region deemed likely to contain any virus present in the target program. A purpose of the evaluation phase is to analyze any suspicious behavior observed during the decryption and exploration phases to determine whether the target appears to be infected.

31 Claims, 8 Drawing Sheets

DYNAMIC HEURISTIC METHOD FOR DETECTING COMPUTER VIRUSES USING DECRYPTION EXPLORATION AND EVALUATION PHASES

CROSS-REFERENCE TO RELATED APPLICATIONS

This application claims priority from U.S. patent application Ser. No. 08/535,340 filed Sep. 28, 1995, now U.S. Pat. No. 5,696,822, entitled "Polymorphic Virus Detection Module", which issued on Dec. 9, 1997, and is hereby incorporated by reference herein.

I. BACKGROUND

A. Technical Field

This invention relates to computer antivirus software. More particularly, this invention relates to software for detecting unknown computer viruses using emulation and artificial intelligence.

B. Related Art

Computer virus detection technology may be divided into categories such as signature scanning, integrity checking, and non-integrity-based unknown virus detection (also called heuristics). This section discusses these categories of antivirus technology.

Signature scanning antivirus programs work by scanning files for signatures of known viruses. A signature is a sequence of bytes that may be found in a virus program code, yet is unlikely to be found elsewhere. To "extract" a signature, an antivirus researcher must analyze the virus. Once this signature is determined, it is recorded in a database of virus signatures to be used by an antivirus program. The antivirus program scans a target program (executable file, boot record, or possibly document file with a macro) to detect the presence of a virus signature. If a signature is found, then the target program is deemed infected. Otherwise, the target program is considered uninfected.

A signature scanning antivirus program can identify particular virus strains for removal and may have a low "false-positive" rate if properly implemented. However, only viruses whose signatures have already been determined and stored in the signature database may be detected using signature scanning. Moreover, the signature database must be updated frequently to detect the latest viruses.

Integrity checking (called "inoculation" by the commercial Norton Anti-Virus product from Symantec Corp.) is a technique in which "snapshots" or "fingerprints" are taken of programs (executable files, boot records) on the computer under the assumption that all these files are in an uninfected state. These fingerprints are typically taken after the computer has been scanned with a virus scanner that reasonably assures the computer is virus-free. These fingerprints are then saved into a database for later integrity-based scans.

During subsequent integrity-based scans of the computer, the antivirus program verifies that each previously fingerprinted program on the computer matches its fingerprint. If a program does not match its fingerprint, then the antivirus program typically uses artificial intelligence to determine if the modification is "virus-like" or merely a valid program update. If the modification appears due to an infection by a virus, the antivirus program typically alerts the user to the modification and gives the user the option to repair the damage, if possible.

Because integrity checking does not scan for virus signatures, it can be used to detect new and (as yet) unknown virus strains. Integrity checking works because viruses must generally make changes to their host program, and these changes can be detected if the database of fingerprints of clean programs is properly created and maintained. However, integrity checking does not work if the computer is not virus-free when the programs are fingerprinted. A virus-infected program that is "inoculated" along with other clean programs would be a safe haven from where the virus can infect other programs. Furthermore, when a change is detected by integrity checking, it is often difficult for the antivirus program to determine if the change was virus-induced or user-induced (e.g., the user may update a program by installing a new version or copying an updated file). If this determination cannot be made by the antivirus program, the user must be called upon to make this determination, and many users are not knowledgeable enough to do so.

Non-integrity-based (also called "heuristic") unknown virus detection is used to detect new and unknown viruses without any integrity information. A heuristic antivirus program examines a target program (executable file, boot record, or possibly document file with a macro) and analyzes its program code to determine if the code appears virus-like. If the target program's code appears virus-like, then the possible infection is reported to the user.

Heuristic virus detection can detect new and unknown viruses that have not yet been analyzed by antivirus researchers since it does not use virus signatures. Because the heuristic technique does not use integrity information, it does not require fingerprints of programs to be taken and saved when the computer is in a known clean state.

Heuristic virus detection can be classified as either static or dynamic. The primary difference between these two detection schemes is that the dynamic method uses CPU emulation while the static method does not.

i. Static Heuristic Detection

In static heuristic virus detection, the antivirus program searches the instructions of a target program for sequences of instructions that perform operations typically used by viruses. Unlike virus signatures, these sequences are not designed to be specific to a single virus. Instead, they are meant to be as general as possible in order to detect the operation of many different viruses.

For example, the following sequence X86 (Intel microprocessor) machine code instructions may be used to open a file:

| assembly language | machine code |
| --- | --- |
| MOV DX, ???? | BA ?? ?? |
| MOV AX, 3D02 | B8 02 3D |
| INT 21 | CD 21 | where ?? indicates that the byte may vary in different viruses. Similarly, the following sequence of X86 machine code instructions may be used to write to a file:

| assembly language | machine code |
| --- | --- |
| MOV DX, ???? | BA ?? ?? |
| MOV CX, ???? | B9 ?? ?? |

-continued

| assembly language | machine code |
|---|---|
| MOV AX, 4000 | B8 00 40 |
| INT 21 | CD 21 | where again ?? indicates that the byte may vary in different viruses.

Static heuristic antivirus programs search for sequences of bytes like those shown above, then makes an assessment of viral infection based on the sequences it found. For example, if the static heuristic antivirus program finds a file open operation, followed by file read and write operations, and also finds a character (ASC II) string "VIRUS" in the program, it may report that the file is infected by an unknown virus.

Some (self-decrypting) computer viruses have encrypted viral bodies. Sequences of instructions that exhibit virus-like behavior are not identifiable while they are encrypted. Therefore, some static heuristic detection programs precede the behavior searching phase with a decryption phase which is typically performed using a CPU emulator.

Although static heuristic detection programs can be relatively fast, they may recognize only some of the numerous different ways of performing various virus-like operations. For example, a virus writer may re-order the instructions of the file open sequence above as follows:

| assembly language | machine code |
|---|---|
| MOV AX, 3D02 | B8 02 3D |
| MOV DX, ???? | BA ?? ?? |
| INT 21 | CD 21 |

As a further example, a virus written may more radically change the instructions for a file open as follows:

| assembly language | machine code |
|---|---|
| MOV AX, 3E00 | B8 00 3E |
| SUB AX, 0100 | 2D 00 01 |
| MOV DX, 1234 | BA 34 12 |
| ADD AL, 02 | 04 02 |
| INT 21 | CD 21 |

Thus, the static heuristic detection program must look for a large number of different ways each virus-like operation may be implemented in order to reliably detect virus-like behavior. A data-base covering large number of possible permutations of these operations may become unmanageable. This problem would be particularly acute if a virus writer wrote a "virus generator" program which generated thousands of viruses at a time, permuting the order of its sections of code, but not changing its effective behavior. Such a multitude of viruses would be very difficult to deal with for static heuristic detection programs.

ii. Dynamic Heuristic Detection

In dynamic heuristic virus detection, the antivirus program emulates the target program in a virtual environment and observes the emulated instructions for virus-like operations. As the target program is emulated, its virus-like operations are identified and catalogued. From the catalog of virus-like operations, the dynamic heuristic antivirus program can determine if the target program looks like a virus. Naturally, if the virus has an encrypted viral body, this emulation-based dynamic method can allow the virus to decrypt before observing its virus-like operations (opening files, finding files, etc.).

Dynamic heuristic virus detection can detect many different permutations of a given operation more easily than the static heuristic method. For example, consider the dynamic heuristic detection of a file open operation. Any time an interrupt is called during the emulation, the dynamic heuristic antivirus program checks the values in the registers. These values specify the task that the target program wants the operating system to perform on its behalf. As discussed above regarding static heuristics, a virus infecting the target program may choose to put certain values in the registers in a great variety of ways. However, when the interrupt is finally called, the registers must contain the certain values that correspond to the desired operation. A dynamic heuristic antivirus program is only concerned with the values of the registers at the time of the interrupt call.

While the dynamic heuristic technique is superior in detecting virus-like operations, there are at least three problems to overcome in its implementation. The following is a discussion of these three problems.

First, extensive emulation may be required before the virus-like operations occur. For example, a virus may idle-loop 50,000 times before a file open operation. In that case, a very large number of instructions would have to be emulated before the file open operation is reached. This would greatly slow down the antivirus program.

Second, some viruses activate only when certain arbitrary conditions are met. For example, consider the following pseudo-code of a virus:

1. Find the first file in the current directory that has a ".com" extension (*.com).
2. If a file was found, go to Step 4.
3. Return control to the host program.
4. If the file is less than 1000 bytes long, go to Step 3.
5. If the file name does not end in "EL", go to Step 3.
6. Open the file.
7. Read the first 3 bytes.
8. Seek to the end of the file.
9. Write virus bytes to the file.
10. etc.

If a dynamic heuristic antivirus program were to emulate a host program infected with such a virus, it would encounter first in the virus Step 1 which instructs to find the first *.com file in the current directory. Here, the antivirus program can simulate the DOS call and indicate to the virus that a mock *.com program was found.

Subsequently, in Step 4, the emulator is instructed to return control from the virus to the host program if the mock *.com program did not have a file size of at least 1000 bytes. How is the antivirus program going to anticipate such an arbitrary condition?

Perhaps the antivirus program will be lucky and the mock *.com program had a file size of at least 1000 bytes. Subsequently, in Step 5, the emulator is instructed to return control from the virus to the host program if the file name does not end in "EL". Once again, if this criterion is not met (e.g., the file name is "FOO.COM," ending in "OO"), the virus will immediately terminate and return control to the host program.

Thus, a virus may be designed to be arbitrarily "picky" in its infection process and if any one criterion (such as the date being the 5$^{th}$ of the month) is not met, the virus will fail to execute its infectious behavior. Consequently, a dynamic heuristic antivirus program will not observe the infectious behavior and will not detect the virus.

Third, while a "direct action" virus (such as the examples discussed above) infects other programs as soon as an infected host program is launched, a "memory resident" virus installs itself as a resident interrupt handler and remains dormant until the appropriate interrupt is called. After installing itself as a resident interrupt handler, the memory resident virus returns control to the host program.

A dynamic heuristic antivirus program begins emulation at the main entry-point of a target program. However, the infectious viral code (the part of the virus that infects other programs) of a memory resident virus is not reached via the main entry-point of its host program. Instead, the infectious viral code is executed only when the interrupt into which the virus is hooked is called, and such a call to the operating system may be made by a different program other than the infected host program.

So, even if the dynamic heuristic antivirus program emulates the infected host program for a very long time, the infectious viral code may not be reached, and thus the suspicious viral operations may go undetected.

II. SUMMARY OF THE INVENTION

The above described problems are overcome by the present invention. The present invention relates to a dynamic heuristic method for detecting computer viruses comprising three phases: a decryption phase, an exploration phase, and an evaluation phase. A purpose of the decryption phase is to emulate a sufficient number of instructions to allow an encrypted virus to decrypt its viral body. A purpose of the exploration phase is to emulate at least once all substantial sections of code within a region deemed likely to contain any virus present in the target program. A purpose of the evaluation phase is to analyze any suspicious behavior observed during the decryption and exploration phases to determine whether the target appears to be infected.

IV. DESCRIPTION OF THE PREFERRED EMBODIMENTS

Figure 1:
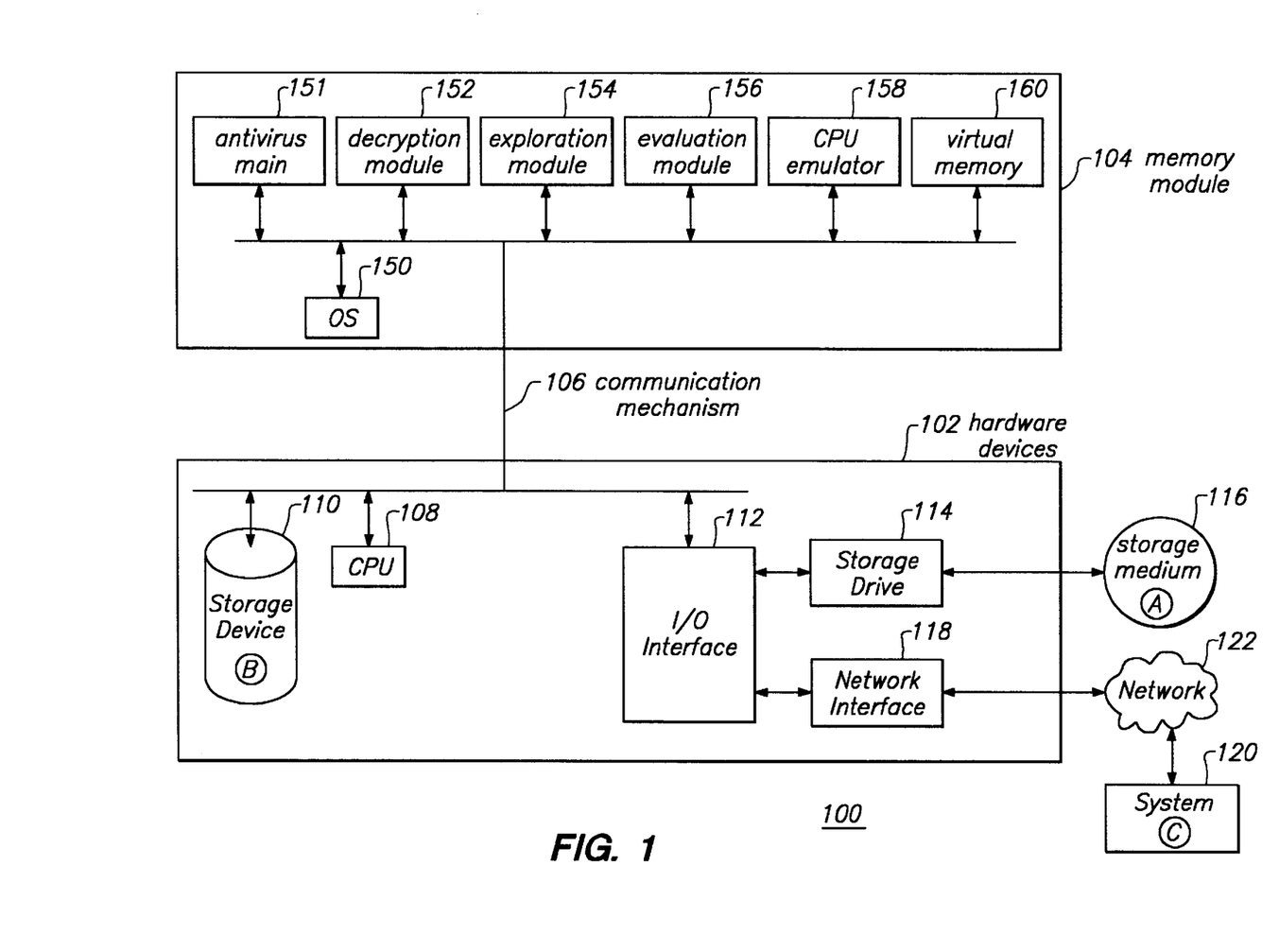
FIG. 1 is a block diagram illustrating a structure of a computer platform which includes a preferred embodiment of the present invention.

FIG. 1 is a block diagram illustrating a structure of a computer platform which includes a preferred embodiment of the present invention. The computer platform 100 includes hardware devices 102 and a memory module 104 for storing programs and data. Communications between the memory module 104 and the hardware devices 102 occurs through a communication mechanism 106 (e.g., a bus).

Preferably, the hardware devices 102 include, but are not limited to: a central processing unit (CPU) 108 (e.g., an Intel "x86" or a Motorola POWER PC processor) communicating with: a storage device 110 (e.g., a hard disk drive) and an input/output (I/O) interface 112 (e.g., a small computer system interface (SCSI) or a Personal Computer Memory Card International Association (PCMCIA) interface). Communicating with the I/O interface 112 are: a storage drive 114 (e.g., a floppy disk drive), which can read programs and data from a storage medium 116 (e.g., a floppy disk), and a network interface 118 (e.g., an ethernet card or a modem), which communicates with a remote system 120 via a network 122 (e.g., a local area network, a wide area network, an intranet, or the global public Internet). A target software program (or a target data file) suspected of having a computer virus may be stored either on the storage medium 116 (A), the storage device 110 (B), or the remote system 120 (C).

Preferably, the programs and data stored in the memory module 104 include, but are not limited to: an operating system (OS) 150, such as DOS, Windows 3.1, or Windows 95 from Micorsoft (or even Windows NT from Microsoft, or OS/2 from IBM, or Macintosh OS from Apple Computer, or a flavor of UNIX), an antivirus main module 151, a decryption module 152, an exploration module 154, an evaluation module 156, a CPU emulator 158, and virtual memory 160.

A description of the operation of the decryption module 152, the exploration module 154, and the evaluation module 156 begins below in the discussion relating to FIG. 2B.

The CPU emulator 158 executes files in a fully contained virtual environment. The virtual environment includes the virtual memory 160 which is effectively independent of the memory of the host computer system. In this way, the CPU emulator 158 is effectively isolated from the actual hardware devices 102 so that no harm can be done by a virus while a file is being simulated.

Figure 2A:
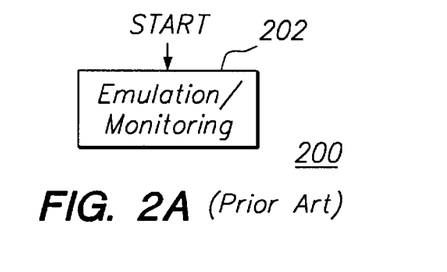
FIG. 2A is a high-level flow diagram of a first and conventional dynamic heuristic method for detecting computer viruses.

FIG. 2A is a high-level flow diagram of a first and conventional dynamic heuristic method 200 for detecting computer viruses. In the first method 200, a single phase 202 emulates the target program and monitors the emulation for virus-like operations. Such a prior art method is described in U.S. Pat. No. 5,398,196 which issued on Mar. 14, 1995 to David A. Chambers.

Figure 2B:
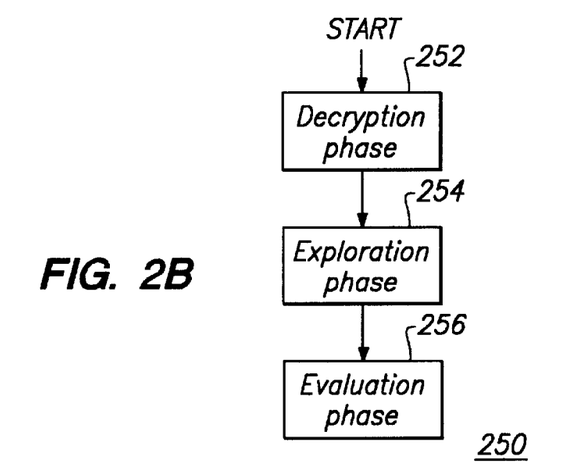
FIG. 2B is a high-level flow diagram of a second and preferred dynamic heuristic method for detecting computer viruses according to the present invention.

FIG. 2B is a high-level flow diagram of a second and preferred dynamic heuristic method 250 for detecting computer viruses according to the present invention. The second method 250 begins with a decryption phase 252 which involves emulation. A purpose of the decryption phase 252 is to emulate a sufficient number of instructions to allow an encrypted virus to decrypt its viral body. The decryption phase 252 is described below in relation to FIG. 3. When the decryption phase 252 is completed, the second method 250 continues with an exploration phase 254 which also involves emulation. A purpose of the exploration phase 254 is to emulate at least once all sections of code within a region likely to contain any virus present, said region being referred to as the virus proper region. In contrast, the emulation phase 202 in FIG. 2A is not so comprehensive as to emulate all sections of code in such a region. The exploration phase 254 is described below in relation to FIG. 5. Following the exploration phase 254, the second method 250 continues with an evaluation phase 256. A purpose of the evaluation phase 256 is to analyze any suspicious operations observed during the decryption and exploration phases 252 and 254 to determine whether or not the target program appears to be infected by a computer virus. The evaluation phase 256 is described below in relation to FIG. 8.

Figure 3:
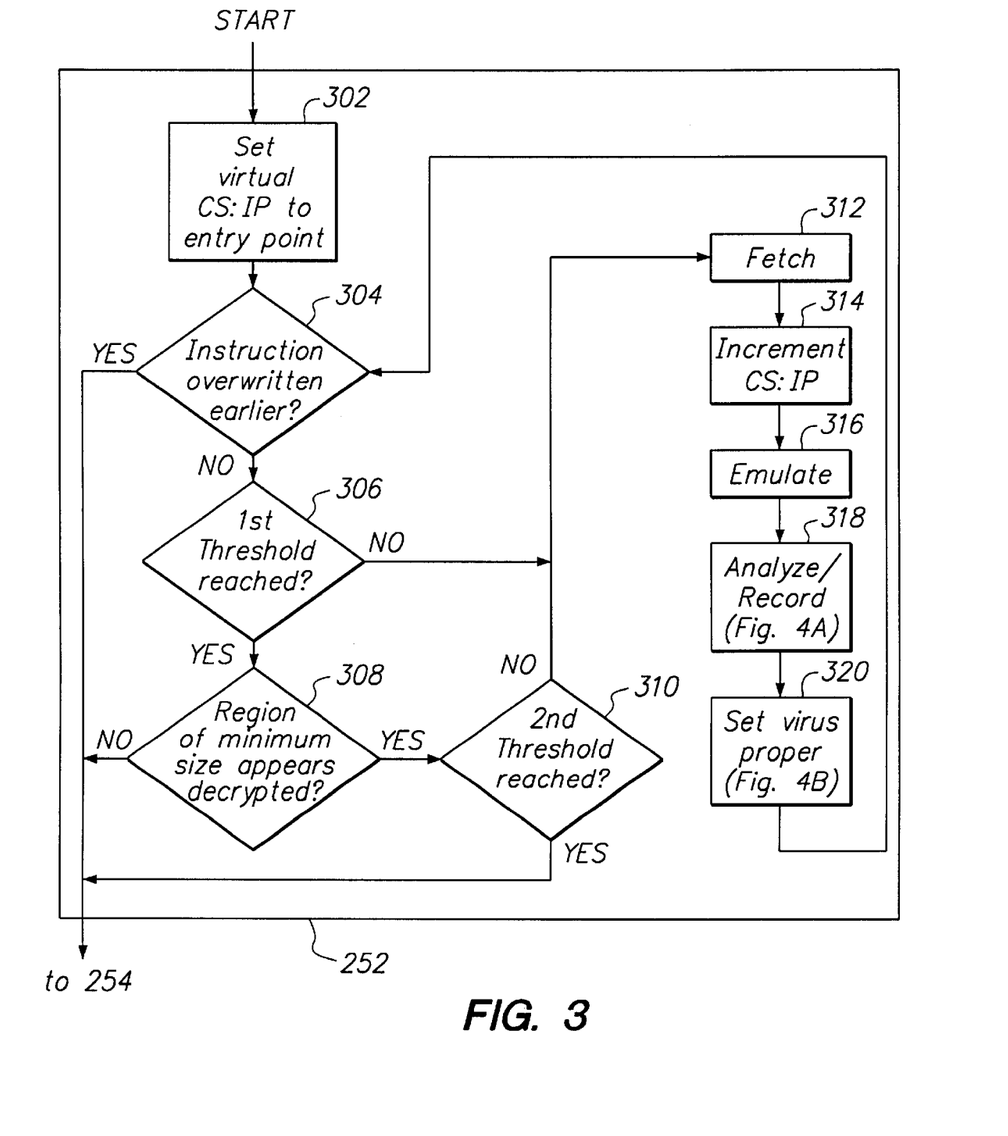
FIG. 3 is a flow diagram of the decryption phase of the second method according to a preferred embodiment of the invention.

FIG. 3 is a flow diagram of the decryption phase 252 according to a preferred embodiment of the invention. When the antivirus main module 151 is set to scan a target program (A, B, or C in FIG. 1) to determine heuristically whether or not the target program contains virus-like code, the main module 151 begins the decryption phase 252 which includes the following ten procedures 302, 304, 306, 308, 310, 312, 314, 316, 318, and 320.

In a first procedure 302, the decryption module 152 sets the virtual code segment:instruction pointer (CS:IP) of the CPU emulator 158 to the entry-point address of the target program. For example, if the target program is a *.com program, then the virtual IP would be reset to point to the word at 100h in the code segment of the *.com program which is the location of the first executable address of the program. As another example, if the target program is an *.exe program, then the virtual CS would be set to the value of the word at 16h and the virtual IP would be set to the value of the word at 18h in the EXE header as that virtual CS:IP should point to the first executable address of the program.

In a second procedure 304, the decryption module 152 determines whether or not the instruction at the virtual CS:IP was previously modified by another emulated instruction (i.e., whether or not the address of the instruction had been previously written over by a prior emulated instruction). If the instruction at the virtual CS:IP was previously modified, this indicates that a decryption routine of a self-decrypting virus appears to be finished decrypting the viral body and is now trying to execute a decrypted instruction from the viral body. Therefore, if the instruction at the virtual CS:IP was previously modified, then the decryption phase 252 ends and the exploration phase 254 begins.

If the instruction at the virtual CS:IP was not previously modified, then the decryption module 152 performs a third procedure 306 of checking whether or not a first threshold number of instructions have been emulated. The first threshold number of emulated instructions is predetermined such that typical encrypted viruses would have started to decrypt by the time the first threshold number of instructions have been emulated. In a preferred embodiment, the first threshold number of emulated instructions is three hundred eighty-four (384) instructions. If the first threshold has not yet been reached, then the decryption module 152 continues the emulation by going to a sixth procedure 312, described in more detail below, which fetches the instruction at the CS:IP.

On the other hand, if the first threshold number has been reached, then the decryption module 152 determines in a fourth procedure 308 whether a region of a certain minimum size or larger appears to have been decrypted. Instructions appear to have been decrypted if they have been overwritten. In a preferred embodiment, this certain minimum size is 24 bytes. This certain minimum size of the region is only a fraction (one sixteenth in this case) of the first threshold number of emulated instructions. If no such region appears to have been decrypted, then under the assumption that any virus present is unlikely to be an encrypted virus, the decryption phase 252 ends and the exploration phase 254 begins.

On the other hand, if such a region appears to have been decrypted, then emulation in the decryption phase 252 continues to allow further decryption by fetching the instruction at the virtual CS:IP in the sixth procedure 312 unless a second threshold number of emulated instructions has been reached.

Checking for whether the second threshold has been reached is performed in a fifth procedure 310. In a preferred embodiment, the second threshold is set to about thirty thousand (30,000) instructions. Once the second threshold number of emulated instructions has been reached, then the decryption phase 252 ends and the exploration phase 254 begins. The purpose of the second threshold is to limit the time taken to allow a virus to decrypt. If the second threshold is reached, the exploration phase 254 begins under the assumption that a significant region of the viral body has been decrypted and exploration of that region is warranted.

In the sixth procedure 312, the decryption module 152 causes the CPU emulator 158 to fetch the instruction stored at the memory address indicated by the virtual CS:IP.

In a seventh procedure 314, the decryption module 152 causes the CPU emulator 158 to increment the virtual CS:IP so that it points to the next instruction in the target program (i.e., to the instruction immediately following the one just fetched).

In an eighth procedure 316, the decryption module 152 causes the CPU emulator 158 to emulate the just-fetched instruction. Because the just-fetched instruction is being emulated by the CPU emulator 158 in a virtual environment, rather than being executed by the actual CPU 108 of the computer system 100, the computer system 100 and its files are protected from any harm from the instruction being emulated.

In a ninth procedure 318, the decryption module 152 analyzes the just-emulated instruction and records any "suspicious" operations indicated by the analysis. This analysis/recording procedure 318 is described in further detail below in relation to FIG. 4A.

In a tenth procedure 320, the decryption module 152 sets the virus proper region. This setting procedure 320 is described in further detail below in relation to FIG. 4B. Following the tenth procedure 320, the decryption module 152 loops back to the second procedure 304.

An advantage of the decryption phase 252 described above is that the substantial majority of self-decrypting viruses are allowed to decrypt much or all of their viral bodies, and this is done without spending too much processing time per file. The decrypted portions of any encrytped viral bodies can then be explored in the subsequent exploration phase 254.

Figure 4A:
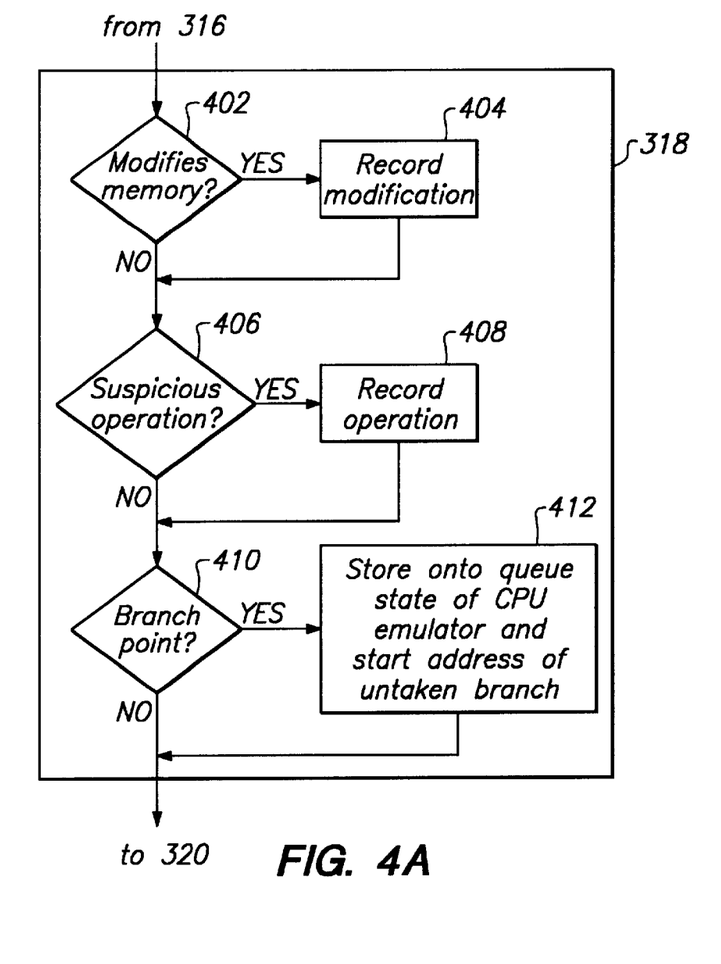
FIG. 4A is a flow diagram of the ninth (analyze/record) procedure of the decryption phase according to a preferred embodiment of this invention.

FIG. 4A is a flow diagram which describes a process for the ninth procedure (the analysis/recording procedure) 318 of the decryption phase 252 according to a preferred embodiment of this invention. This analysis/recording procedure 318 begins after the CPU emulator 158 emulates the just-fetched instruction in the eighth procedure 316 of the decryption phase 252.

The ninth procedure 318 begins with a first step 402 in which the decryption module 152 determines whether or not the just-emulated instruction modifies the content stored at a (virtual) memory address within the (virtual) address space of the target program. Such a modification is indicative of decryption taking place.

If such a modification is performed by the just-emulated instruction, then the decryption module 152 performs a second step 404 of recording that modification for future reference (such a reference occurring in the second procedure 304 of the decryption phase 252) before performing a third step 406. Otherwise, if such a modification is not performed, then the decryption module 152 goes straight from the first step 402 to the third step 406.

In the third step 406, the decryption module 152 determines whether or not any suspicious operation from a predetermined list of suspicious operations is performed by the just-emulated instruction. The predetermined list of suspicious operations include operations characteristically performed by viruses but not typically performed by "legitimate" uninfected programs.

In this embodiment, the list of suspicious operations includes, but is not limited to, the following suspicious operations:

1. File opens (read-only, read-write, etc.);
2. File reads (sub-categories: 3–4 bytes, between 5 and 8 bytes, 12–14 bytes, 128 or more bytes, etc. These values are chosen because of their particular significance in certain computer viruses.);
3. File writes (sub-categories: 3–4 bytes, between 5 and 8 bytes, 12–14 bytes, 1Ch to 1Eh bytes, 128 or more bytes, etc.);
4. File seeks (to the top of the file, to the end of the file, etc.);
5. File get/set attribute;
6. File get/set date/time;
7. File find-first/find-next;
8. File delete;
9. File create;
10. File rename;
11. Change directory, get current directory, set current directory;
12. File get/set DTA;
13. Interrupt revectoring (interrupt 13 for disk services, interrupt 21 for DOS services, interrupt 24 for error handling, etc.)
14. Modification of memory allocation (in particular, reads/writes to program segment prefix);
15. Program execution;
16. Program residency self-check calls (typically used by viruses);
17. Read/write to master boot record (MBR) using BIOS disk services (typically used in multipartite and dropper viruses);
18. In-memory modification of CS:100 in \*. com programs (typically done in viruses infecting \*.com programs).

If it is determined that suspicious operation is being performed by the just-emulated instruction, the suspicious operation is recorded by the decryption module 152 in a fourth step 408.

In the fifth step 410, the decryption module 152 determines whether or not the just-emulated instruction comprises a branch point. In this specification, a branch point is an instruction which conditionally or unconditionally transfers control to an instruction not sequentially following the branch point instruction. Such a branch point indicates that while one branch of instructions is taken, an alternate branch of instructions is not being taken.

As described above in the background section with respect to the second problem of prior dynamic heuristic antivirus methods, such untaken branches may contain infectious viral code which activates only upon satisfaction of certain arbitrary conditions. For example, consider the following section of assembly language instructions from a hypothetical virus:

```
180   MOV AX, [TargetHostProgramSize]
185   CMP AX,1000
188   JLE 210
 . . .
210   HLT
```

The above section of instructions checks to see if the potential host program that it has located (the target host program) is greater than a minimum size (1000h bytes). If the potential host program is bigger, then it will be considered for infection (i.e. the jump is not taken). Otherwise, the potential host program is not considered for infection and the virus merely halts (i.e. the jump is taken). Branch points such as this one are critical because if the virus does not have its criteria for a host program satisfied, the infectious code may remain in an untaken branch which is not explored by a prior art dynamic heuristic antivirus program.

In light of a need to eventually analyze such untaken branches, if the just-emulated instruction comprises a branch point, then the decryption module 152 in a sixth step 412 stores onto a queue the destination address of the untaken branch (i.e. the address of the first instruction of the untaken branch) and the current state of the CPU emulator 158, before it ends the ninth procedure 318 and begins the tenth procedure 320. The state of the CPU emulator 158 does not refer to the entire virtual CPU/memory state, which is prohibitively large, but rather to a small subset of that state. This subset is sufficient to detect the majority of viruses of current concern. In this embodiment, the state of the CPU emulator 158 includes, but is not limited to, the virtual CS:IP, certain commonly used registers such as the AX, BX, CX, DX registers, and several words at the top of the SS:SP stack.

If only the destination address of the untaken branch, but not the CPU emulator state, were stored, then certain operations would go undetected when that branch of instructions was later explored during the exploration phase 254. For example, consider the following hypothetical section of code from a virus:

```
100   MOV   AX,4200
103   MOV   CX,0000
106   MOV   DX,0000
109   INT   21         INT 21, AX=4200: SEEK TOP OF FILE
10B   JC    120
10D   MOV   AL,02      INT 21, AX=4202: SEEK TOP OF FILE
```

```
-continued

10E    INT    21
...
120    MOV    AX,FFFF
123    RET
```

If the above code were to execute in the emulator and seek instruction at offset 109 were to yield a CARRY result (indicating a seek error), then the jump at offset 10B would be taken to the instruction at offset 120. In that case, the untaken destination address saved upon the queue would be 10D and the state of the CPU emulator 158 saved upon the queue would be CS:10D, AX=4200, BX=????, CX=DX=0, the top 8 words of the stack, etc. Later when that untaken branch is explored, the instruction at offset 10D would change AX to 4202, and the instruction at offset 10E would be a seek instruction which is a suspicious operation. However, if the state of the CPU emulator 158 were not saved upon the queue, then the AX register might contain a value such as the FFFF due to an instruction such as the one at offset 120. In that case, when the untaken branch is explored, the instruction at offset 10D would change AX to FF02, and the instruction at offset 10E would not accurately exhibit the operation of the viral code.

Otherwise, if the just-emulated instruction is not a branch point, then the decryption module 152 ends the ninth procedure 318 and begins the tenth procedure 320. The tenth procedure 320 is described in further detail below in relation to FIG. 4B.

Figure 4B:
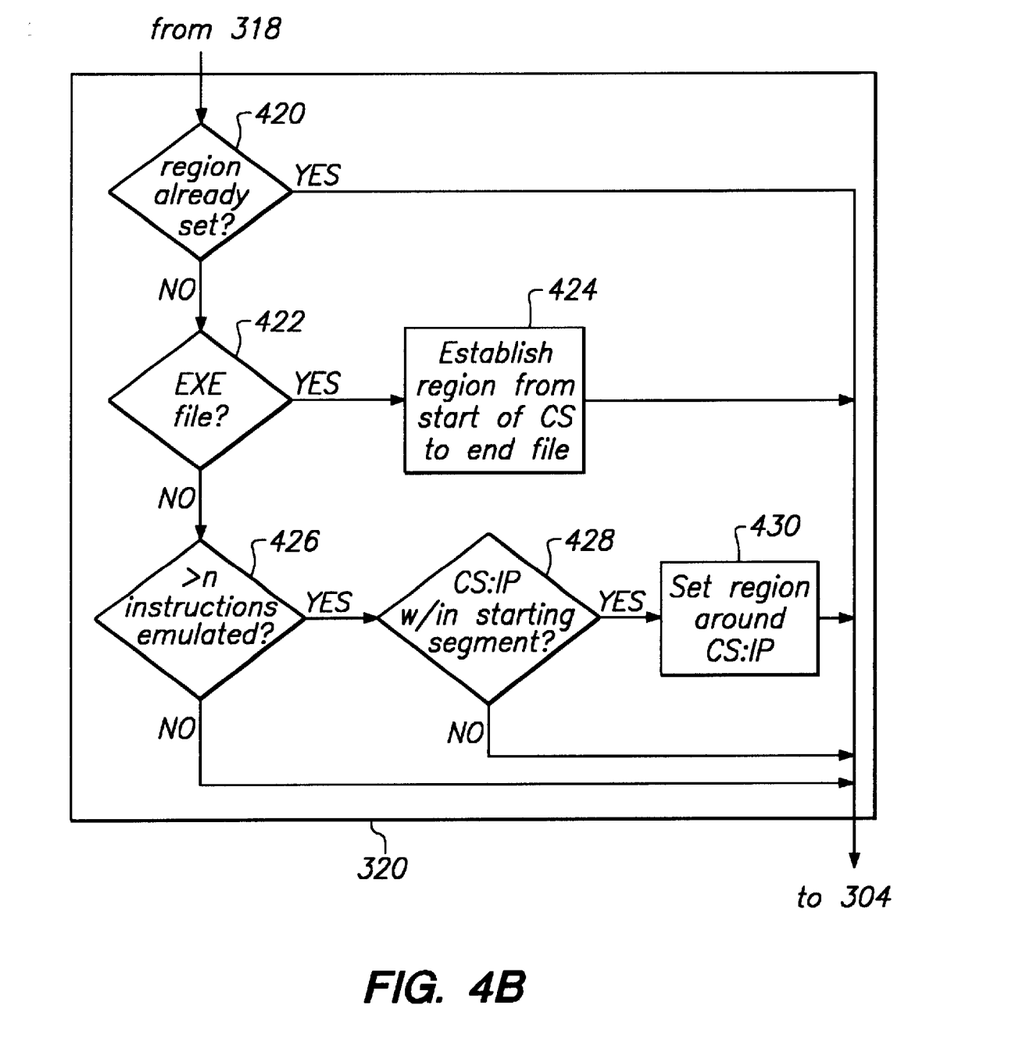
FIG. 4B is a flow diagram of the tenth (set virus proper) procedure of the decryption phase according to a preferred embodiment of the present invention.

FIG. 4B is a flow diagram of the tenth procedure 320 of the decryption phase 252 according to a preferred embodiment of the present invention. This tenth procedure 320 determines a relatively likely location of the virus in the target program.

In a first step 420, the decryption module 152 determines whether or not the virus proper region has already been set (i.e., during a prior performance of either a third step 424 or a sixth step 430 as discussed further below). If the region has already been set, then the tenth procedure 320 ends and the decryption module 152 loops back to the second procedure 304 of the decryption phase 252.

Otherwise, in a second step 422 the decryption module 152 determines whether the target program is an EXE file. If it is an EXE file, then the decryption module 152 in a third step 424 sets the virus proper region to be the region from the start of the beginning code segment (CS) to the end of file for the target program. Following the third step 424, the tenth procedure 320 ends and the decryption module 152 loops back to the second procedure 304 of the decryption phase 252.

Otherwise, if the target program is not an EXE file, it is generally a COM file. For COM files, the decryption module 152 in a fourth step 426 determines whether the number of instructions of the target program which have been emulated is greater than n, where n is a predetermined number. In a preferred embodiment, n=10.

If the number of instructions emulated is greater than n, then the decryption module 152 in a fifth step 428 determines whether the current virtual CS:IP is within the beginning memory segment of the target program. If the current virtual CS:IP is outside the beginning segment, then the tenth procedure 320 ends and the decryption module 152 loops back to the second procedure 304 of the decryption phase 252.

Otherwise, if the current virtual CS:IP is within the beginning segment, then in a sixth step 430 the virus proper region is set based upon the current virtual CS:IP. In a preferred embodiment, the region is set to include the 4k (4096) bytes centered about the current virtual CS:IP. Subsequently, the tenth procedure 320 ends and the decryption module 152 loops back to the second procedure 304 of the decryption phase 252.

Figure 5:
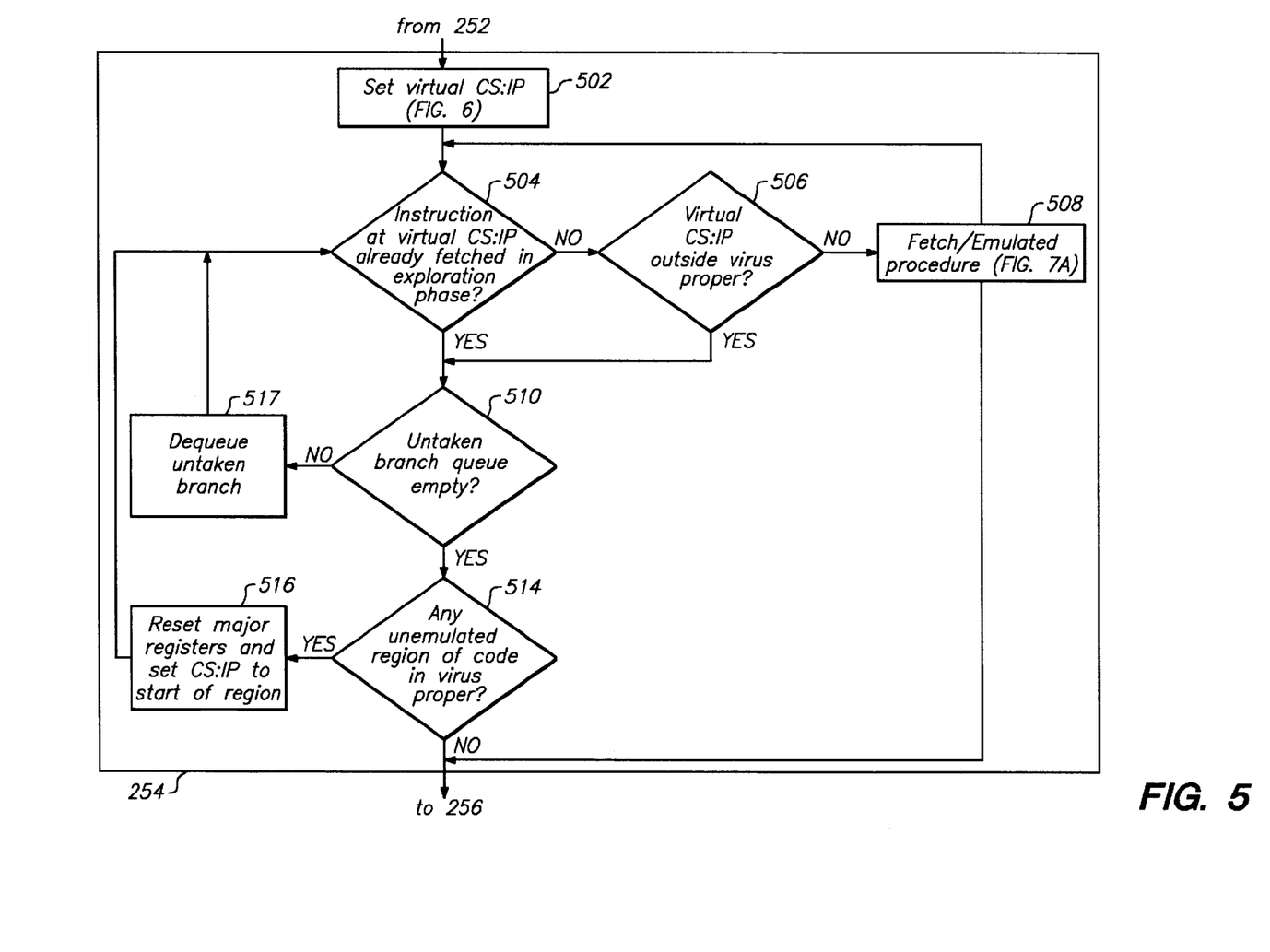
FIG. 5 is a flow diagram of the exploration phase of the second method according to a preferred embodiment of the present invention.

FIG. 5 is a flow diagram of the exploration phase 254 of the second method according to a preferred embodiment of the present invention. The exploration phase 254 is initiated by the main module 151 after the decryption phase 252, unless the decryption module 152 had returned that the target program appeared to be virus-free. Emulation during the exploration phase 254 is limited to those instructions in the virus proper region. The exploration phase 254 includes the following eight procedures 502, 504, 506, 508, 510, 512, 514, and 516.

In a first procedure 502, the exploration module 154 sets the virtual CS:IP of the CPU emulator 158. The first procedure 502 is described in further detail below in relation to FIG. 6.

In a second procedure 504, the exploration module 154 determines whether the instruction at the virtual CS:IP was already fetched during this exploration phase 504. If the instruction at the virtual CS:IP was not already fetched in this exploration phase 504, then the exploration module 154 determines in a third procedure 506 whether the virtual CS:IP is outside the virus proper region.

If the virtual CS:IP is determined in the third procedure not to be outside the virus proper region, then the exploration module 154 in a fourth procedure 508 causes the CPU emulator 158 to fetch the instruction at the virtual CS:IP and emulate the fetched instruction. The fourth procedure 508 is described in further detail below in relation to FIGS. 7A and 7B. After the fourth procedure 508, either the exploration module 154 loops back to the second procedure 504 (if a threshold number of instructions have not yet been emulated), or the exploration phase 254 terminates and the evaluation phase 256 begins (if the threshold number of instruction have been emulated).

On the other hand, if the virtual CS:IP is determined in the third procedure 506 to be outside of the virus proper region, then the exploration module 154 determines in a fifth procedure 510 whether an untaken branch queue is empty. This fifth procedure 510 is also reached if the exploration module determines in the second procedure 504 that the instruction at the virtual CS:IP was already fetched during this exploration phase 254.

If the untaken branch queue is determined in the fifth procedure 510 not to be empty, then the exploration module 154 in a sixth procedure 512 "dequeues" the next untaken branch from the untaken branch queue. Dequeueing the next untaken branch includes setting the virtual CS:IP to the stored destination address of the branch and setting the state of the CPU emulator 158 to the corresponding stored state (both being stored previously during the eighth substep 754 of the fourth step 708 of the fourth procedure 508, see FIG. 7B and the corresponding description below). After the sixth procedure 512, the exploration module 154 loops back to the second procedure 504.

On the other hand, if the untaken branch queue is determined in the fifth procedure 510 to be empty, then the exploration module 154 in a seventh procedure 514 determines whether any unemulated section of code remains within the virus proper region. If such an unemulated section of code remains within the virus proper region, then the exploration module 154 in an eighth procedure 516 resets major virtual CPU registers (to zero) and set the virtual CS:IP to point to the start of the unemulated section of code. After the eighth procedure 516, the exploration module 154 loops back and performs the second procedure 504. On the other hand, if no unemulated section of code remains within the virus proper region, then the exploration phase 254 terminates and the evaluation phase 256 begins. In a preferred embodiment of the present invention, an unemulated section of code will be emulated in the exploration phase 254 even if the section is only one byte (i.e. one instruction) in size. However, this minimum size may be made larger.

Figure 6:
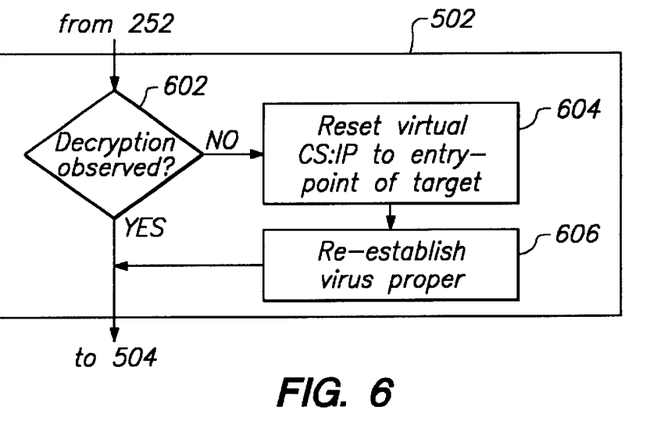
FIG. 6 is a flow diagram of the first (set virtual CS:IP) procedure of the exploration phase according to a preferred embodiment of the present invention.

FIG. 6 is a flow diagram of the first procedure 502 of the exploration phase 254 according to a preferred embodiment of the present invention. If no decryption was observed during the decryption phase 252, then the first procedure 502 resets the virtual CS:IP of the CPU emulator 158 to begin the exploration phase 254.

The first procedure 502 begins with a first step 602 in which the exploration module 154 determines whether the decryption was observed during the decryption phase 252. In particular, if the decryption module 152 determined in the sixth procedure 312 of the decryption phase 252 that the just-emulated instruction was previously modified, then the decryption is considered to have been observed.

If decryption was observed in the first step 602, then the virtual CS:IP remains unchanged so that emulation of the target program will continue from the instruction following the last instruction emulated during the decryption phase 252. In this case, after the first step 602, the first procedure 502 of the exploration phase 254 ends and the second procedure 254 begins.

On the other hand, if decryption was not observed in the first step 602, then the exploration module 154 in a second step 604 resets the virtual CS:IP to the entry-point address of the target program.

After the virtual CS:IP is reset in the second step 604, the exploration module 154 in a third step 606 re-establishes the virus proper region. This re-establishing of the virus proper region may be implemented by incorporating a procedure similar to the procedure 320 shown in FIG. 4B into a loop including procedures similar to the procedures 312, 314, and 316. After the virus proper region is re-established in the third step 606, the first procedure 502 of the exploration phase 254 ends and the second procedure 504 begins.

Figure 7A:
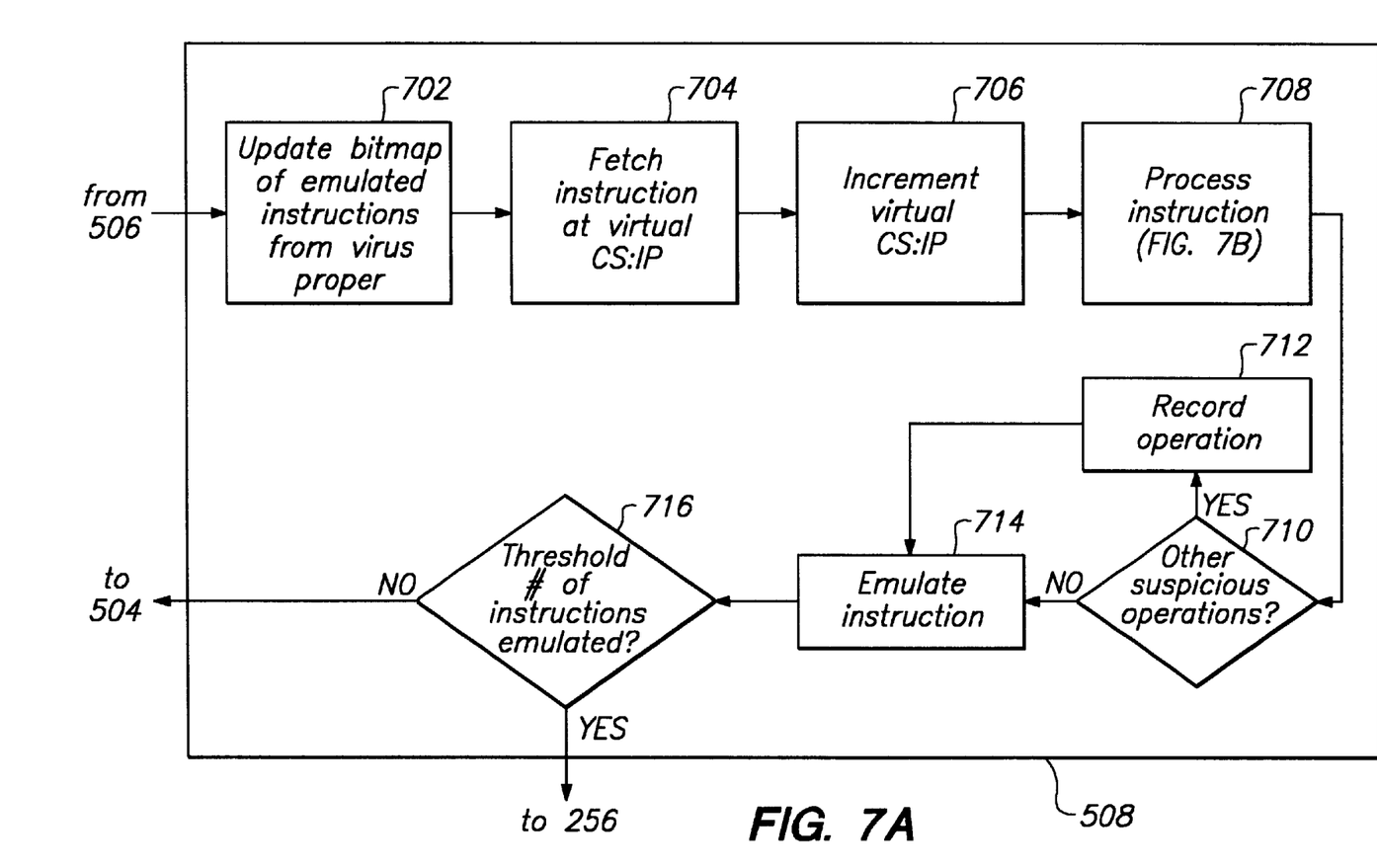
FIG. 7A is a flow diagram of the fourth (fetch/emulate) procedure of the exploration phase according to a preferred embodiment of the present invention.

FIG. 7A is a flow diagram which describes a process for the fourth procedure 508 of the exploration phase 254 according to a preferred embodiment of the present invention. The fourth procedure 508 fetches and emulates the instruction at the virtual CS:IP if the virtual CS:IP was determined 506 to be within the virus proper region.

The fourth procedure 508 begins with a first step 702 in which the exploration module 154 updates a bitmap record of instructions fetched from the virus proper region. Such a bitmap record comprises one bit per byte of the virus proper region. If the bit is zero, then the corresponding instruction byte has not yet been fetched. On the other hand, if the bit is one, then the corresponding instruction byte has already been fetched (and emulated). Thus, the bit that corresponds to the instruction byte pointed to by the virtual CS:IP is set to one in this first step 702. Note that this first step 702 need not occur at the very beginning of the fourth procedure 508 and in another embodiment may occur at another point in the fourth procedure 508.

Following the first step 702, the exploration module 154 in a second step 704 causes the CPU emulator 158 to fetch the instruction stored at the virtual memory address pointed to by the virtual CS:IP.

Following the second step 704, the exploration module 154 in a third step 706 causes the CPU emulator 158 to increment the virtual CS:IP so that it points to the next instruction in the target program (i.e., to the instruction immediately following the one just fetched).

Following the third step 706, the exploration module 154 in a fourth step 708 processes the instruction before emulation occurs. This processing 708 exerts control over certain instructions, such as interrupts and memory writes within the virus proper region, and records the presence of these certain instructions for later use if necessary. This fourth step 708 is described in more detail below in relation to FIG. 7B.

Following the fourth step 708, the exploration module 154 in a fifth step 710 determines whether the just-fetched instruction comprises a suspicious operation not already recorded in the fourth step 708. If such suspicious operation was observed, then the exploration module 154 in a sixth step 712 records the suspicious operation. A list of such suspicious operations is predetermined and was generated from an analysis to find viral behaviors or combinations thereof that are very unlikely to be used in non-infected programs. A list of suspicious operations was given above in relation to FIG. 4A. After the sixth step 712, or directly after the fifth step 710 if no suspicious operation was observed, the exploration module 154 in a seventh step 714 causes the CPU emulator 158 to emulate the just-fetched instruction.

After the seventh step 714, the exploration module 154 in an eighth step 716 determines whether a threshold number of instructions have been emulated after the entry-point of the target program. In a preferred embodiment, the threshold number is set to the number of bytes in the virus proper region. Since for an Intel X86 microprocessor an instruction is at minimum one byte in length, this threshold number is equal to the maximum number of instructions in the virus proper region. This threshold number ensures that the emulation does not continue much beyond the number of instructions in the virus proper region. If the exploration module 154 determines that the number of instructions emulated since the entry-point has reached the threshold number, then it terminates the exploration phase 254, and the main module 151 causes the evaluation module 156 to begin the evaluation phase 256. On the other hand, if the number of instructions emulated since the entry-point has not yet reached the threshold number, then the exploration module 154 loops back to the second procedure 504 where it determines whether the next instruction was already fetched during the exploration phase 254.

Figure 7B:
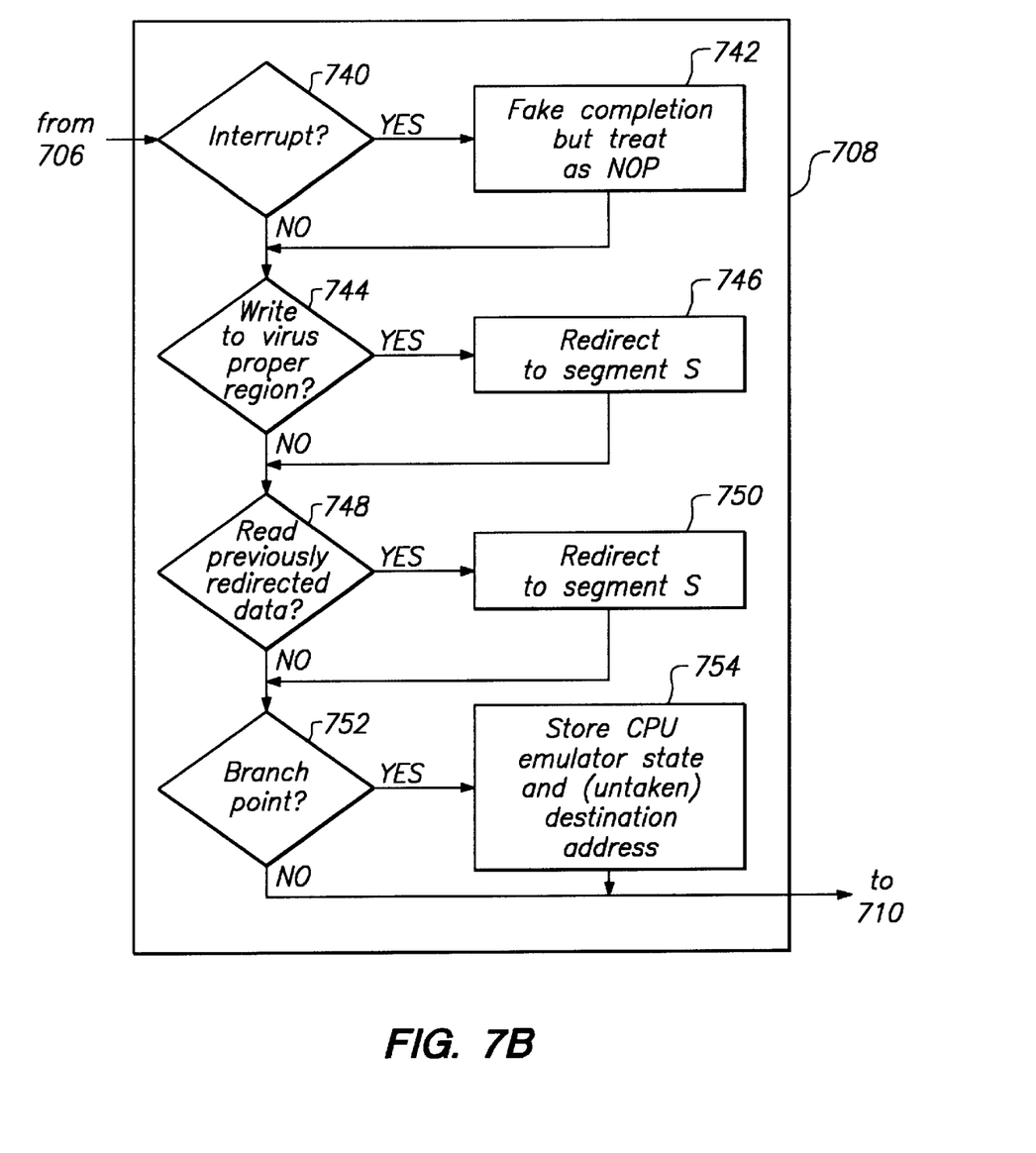
FIG. 7B is a flow diagram of the fourth (process instruction) step of the fourth procedure of the exploration phase according to a preferred embodiment of the present invention.

FIG. 7B is a flow diagram which describes a process for the fourth step 708 of the fourth procedure 508 of the exploration phase 254 according to a preferred embodiment of the present invention. This fourth step 708 processes the instruction prior to emulation.

The fourth step 708 begins with a first substep 740 in which the exploration module 154 determines whether or not the just-fetched instruction is a call to an interrupt vector. If it is a call to an interrupt, then the exploration module 154 in a second substep 742 treats the interrupt as a NOP (no operation) instruction but "fakes" completion of the interrupt by changing appropriate registers of the CPU emulator 158, popping appropriate values off of the stack, and so on. In the second substep 742, the exploration module 154 also checks the appropriate register to determine the nature of the actual instruction called via the interrupt, and the actual instruction is recorded if it is deemed to be suspicious.

In a third substep 744, the exploration module 154 determines whether the just-fetched instruction modifies (i.e. writes to) virtual memory within the virus proper region. Such a memory write, for example, may indicate that the virus appears to be relocating its code, or that the virus is storing data within the virus proper region. In this embodiment, such writes are prevented. If the just-fetched instruction does write to memory within the virus proper region, then the exploration module 154 in a fourth substep 746 redirects the memory write to a virtual memory address in a different virtual segment, defining that virtual segment as segment S, and records such a write to segment S. As discussed below, subsequent data reads from that memory address are redirected to segment S.

The exploration module 154 implements such redirection of subsequent memory reads via fifth and sixth substeps 748 and 750. In the fifth substep 748, the exploration module 154 determines whether the just-fetched instruction initiates a read of data from a location in the virus proper region of memory that the target program previously attempted to modify. If it is determined in the fifth substep 748 that the just-fetched instruction initiates such a memory read of data, then the exploration module 154 in the sixth substep 750 redirects that memory read to segment S. Note, in this embodiment, that fetches from the instruction stream are not to be redirected.

In a seventh substep 752, the exploration module 154 determines whether the just-fetched instruction comprises a branch point. A branch point is defined here as an instruction in a computer program at which a jump occurs or may occur.

If it is determined in the seventh substep 752 that the just-fetched instruction does not comprise a branch point, then the fourth step 708 in FIG. 7A ends and the exploration module 154 goes on to perform the fifth step 710. On the other hand, if it is determined in the seventh substep 752 that the just-fetched instruction is a branch point, then the exploration module 154 in an eight substep 754 stores the current state of the CPU emulator 158 and the destination (also called target) address of the (untaken) branch onto a queue of untaken branches. Subsequently, the fourth step 708 in FIG. 7A ends and the exploration module 154 goes on to perform the fifth step 710.

Figure 8:
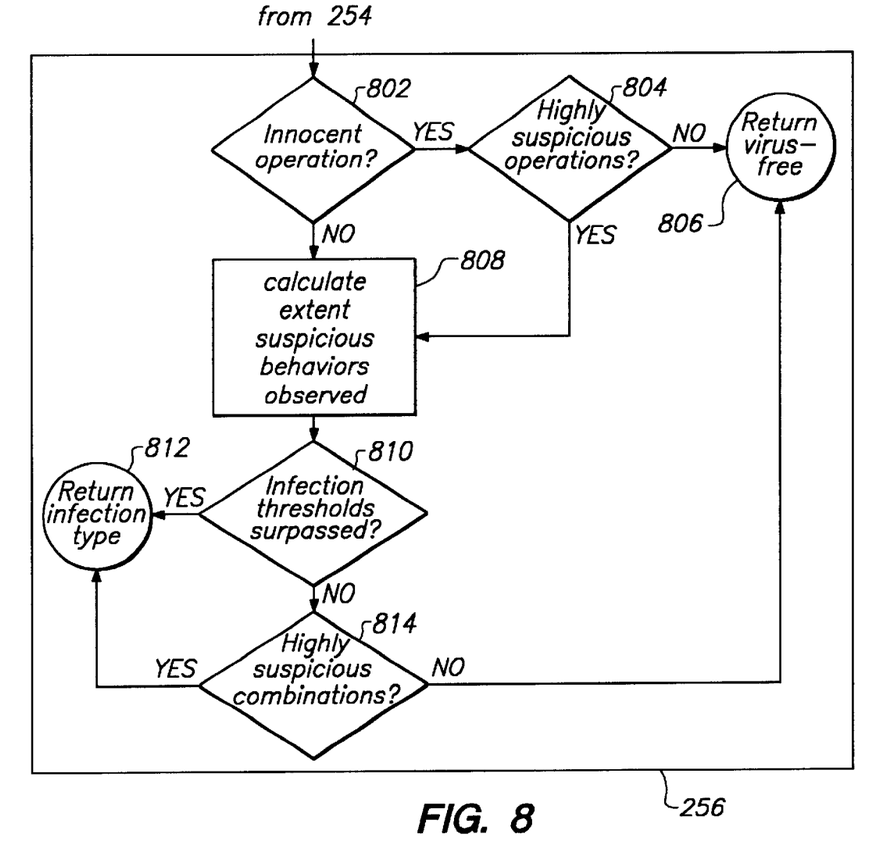
FIG. 8 is a flow diagram of the evaluation phase of the second method according to a preferred embodiment of the present invention.

FIG. 8 is a flow diagram of the evaluation phase 256 which occurs after the exploration phase 254 terminates according to a preferred embodiment of the present invention. The evaluation phase 256 analyzes the suspicious operations observed and recorded during the decryption and exploration phases 252 and 254 to determine whether or not the target program appears to be infected by a computer virus. While this embodiment uses a particular approach to evaluate whether or not the target program is likely to be infected, many other "expert system" approaches may be used in the evaluation phase 256.

In this embodiment, the evaluation phase 256 begins with a first procedure 802 in which the evaluation module 156 determines whether a so-called innocent operation was observed during the decryption or exploration phases 252 or 254. In a preferred embodiment, innocent operations include, but are not limited to:

1. printing a character to a printer or displaying a character to a monitor or other conspicuous output device;
2. a program termination instruction in the virus proper region that is directly reachable from the entry point;
3. re-vectoring of the divide-by-zero error vector (viruses don't generally need to do division); and
4. calling from within the virus proper region to a function located far (more than four kilobytes in a preferred embodiment) away from the current position in the file (since this would indicate a routine larger than most viruses).

If any of the latter three innocent operations was observed, then the evaluation module 156 determines in a second procedure 804 whether or not specific highly suspicious operations or features were observed. In a preferred embodiment, highly suspicious operations or features include, but are not limited to, the following:

1. comparing a word in any register or memory location with "MZ" (such a comparison may be used to determine the presence of an EXE header since "MZ" is an identifying marker or tag or label of such a header);
2. a file write of the same or a suspiciously similar size in bytes as the distance in bytes from the entry-point of the target program to the end-of-file of the target program (a file write of such a size may be used in the process of appending the virus to the next host program);
3. a seek to the end-of-file to determine file size followed by a file write of a jump instruction whose jump distance is suspiciously similar to the file size (such a jump instruction may be used by an appending virus to bypass the clean original body of the next host program);
4. a file write of a number of bytes similar to the number of bytes in an EXE header where the bytes written include "MZ" (such a file write may be used to write a new header to the next host program);
5. having an EXE header in the body of an EXE file that is suspiciously similar to the EXE header of the file (such a header may be used to substitute for the original header of the next host program);
6. a command to find executable (e.g., *.com or *.exe) files in a directory (such a command may be used to find the next host program);
7. examination and modification of the (DOS) memory allocation scheme (not uncommon in viruses, but rare in clean programs);
8. repeat move string operations that move approximately the same number of bytes as the distance in bytes from the entry-point to the end-of-file of the target program (string moves of such a total size may be used in the process of appending the virus to the next host program); and
9. reading/writing to the program segment prefix (indicating a modification of the memory allocation scheme in a backhand way).

If no such highly suspicious operation or combination of operations was observed or the innocent operation was printing or displaying a character, then the evaluation module 156 in a third procedure 806 returns a result to the anti-virus main module 151 that indicates that the target program appears to be virus-free.

Otherwise, if any highly suspicious operation was observed 804 or if no innocent operation was observed 802, then the evaluation module 156 in a fourth procedure 808 calculates the extent to which various suspicious operations were observed during the decryption 252 and/or exploration 254 phases. In a preferred embodiment, the fourth procedure 808 involves calculating for each of several suspicious "behaviors" a value based on the number of occurrences of select suspicious operations indicative of the suspicious behavior, where the number of occurrences is weighted depending on the operation's indicativeness regarding the behavior and where the calculated value is normalized so as not to exceed 100%.

In a preferred embodiment, suspicious behaviors include, but are not limited to, the following:

1. encryption;
2. appending bytes onto a COM file;

3. appending bytes onto an EXE file;
4. opening/closing of a file in standard and non-standard ways;
5. hooking to a memory resident code or routine;
6. critical error handling (re-vectoring a critical error vector);
7. string moves or file writes that are suspiciously similar in size to the target file size;
8. finding a file or finding a first file in a directory; and
9. changing file date/time stamps or other file attributes.

Following the fourth procedure 808, the evaluation module 156 in a fifth procedure 810 determines for each of several types of viruses whether a measure of the suspicious behaviors reaches or surpasses a threshold indicative of infection. In particular, each suspicious behavior is assigned a weight that multiplies its normalized value to arrive at a contribution to the measure. If the measure surpasses a predetermined threshold and every suspicious behavior designated as mandatory for that type of virus is present, then infection by that type of virus is indicated.

In a preferred embodiment, types of viruses include, but are not limited to, the following:
1. memory resident viruses appending to COM files;
2. direct action viruses appending to COM files;
3. memory resident viruses prepending to COM files;
4. direct action viruses prepending to COM files;
5. memory resident viruses appending to EXE files;
6. direct action viruses appending to EXE files;
7. memory resident viruses in general; and
8. direct action viruses in general.

If one (or possibly more) of the thresholds are reached, then in a sixth procedure 812 the evaluation module 156 determines whether any highly suspicious combination of three or more suspicious operations were detected. In a preferred embodiment, these highly suspicious combinations are determined by analyzing various combinations with respect to the universe of known computer viruses and selecting as highly suspicious those combinations which appear in several (e.g., five) percent or more of the known viruses. Other ways of selecting the highly suspicious combinations are possible. When a highly suspicious combination generates a false positive by incorrectly identifying a clean program as infected, then that highly suspicious combination may be removed from the list of highly suspicious combinations. Such a list should be quite robust since more than one highly suspicious combination may be expected to detect a typical virus.

If a highly suspicious combination is detected 814, then the evaluation module 156 performs the sixth procedure 812 of returning to the anti-virus main module 151 the type of infection apparently present in the file. In particular, a label corresponding to the combination(s) detected is returned.

Otherwise, if no highly suspicious combination is detected, then the evaluation module 156 performs the third procedure 806 of returning to the anti-virus main module 151 the result that the file appears to be virus-free.

The above description is included to illustrate the operation of the preferred embodiments and is not meant to limit the scope of the invention. From the above description, many variations will be apparent to one skilled in the art that would yet be encompassed by the spirit and scope of the invention. First, groups of blocks in FIGS. 4A and 7B may be reordered without changing the functionality of the embodiment. (For example, steps 402 and 404 may be moved to be after steps 406 and 408. Or, steps 740 and 742 in FIG. 7B may be moved to be after steps 748 and 750. And so on.) Second, the determination of when to end the decryption phase 252 may be done in alternate ways different from the way using two thresholds which is shown in FIG. 3. Third, the determination of the virus proper region may be done in many alternate ways different from the specific way which is shown in FIG. 4B. Fourth, the evaluation of whether or not the file appears infected may be done in alternate ways different from the vector approach of the evaluation phase 256 illustrated in FIG. 8. Fifth, different criteria, or combinations of criteria, for suspicious operations and behaviors may be used in the evaluation phase 256 that vary from the criteria given in the specification. These are only some of the variations that are rightly encompassed by the present invention. The scope of the invention is to be limited only by the following claims.

What is claimed is:

1. A method for detecting a virus in a digital file, the method comprising the steps of:
   determining at least one region of the digital file in which the virus is likely to be present;
   emulating code within only the at least one region in order to fully explore the at least one region for the virus during an exploration phase;
   pointing to an instruction to be emulated from a section of code;
   determining whether during the exploration phase the instruction to be emulated has already been emulated; and
   if the instruction to be emulated has already been emulated during the exploration phase, then not emulating the instruction to be emulated.

2. The method of claim 1, wherein the at least one region includes an end portion of the digital file.

3. The method of claim 1, wherein the at least one region includes a beginning portion of the digital file.

4. The method of claim 1, wherein the step of emulating code within the at least one region in order to fully explore the at least one region during an exploration phase further comprises the steps of:
   determining whether the instruction to be emulated is outside of the at least one region; and
   if the instruction to be emulated is outside the at least one region, then not emulating the instruction to be emulated.

5. The method of claim 4, further comprising the steps of:
   determining whether any untaken branch destination remains; and
   if any untaken branch destination remains, then pointing to a next untaken branch destination as the instruction to be emulated and setting a state of a CPU emulator to a stored state which corresponds to the next untaken branch destination.

6. The method of claim 5, further comprising the steps of:
   if no untaken branch destinations remain, then determining whether any unemulated section of code remains within the at least one region; and
   if any unemulated section of code remains within the at least one region, then pointing to a beginning instruction of an unemulated section of code as the instruction to be emulated and resetting the state of the CPU emulator.

7. The method of claim 4, wherein emulating the instruction to be emulated comprises the steps of:
   determining whether the instruction to be emulated performs a suspicious operation; and recording the suspicious operation if the instruction to be emulated performs the suspicious operation.

8. The method of claim 4, wherein emulating the instruction to be emulated comprises the steps of:
   determining whether the instruction to be emulated comprises an interrupt; and
   if the instruction to be emulated comprises an interrupt, then faking completion of the interrupt but not actually performing the interrupt.

9. The method of claim 4, wherein emulating the instruction to be emulated comprises the steps of:
   determining whether the instruction to be emulated comprises a memory write to a location within the at least one region;
   redirecting the memory write to a different segment S if the instruction to be emulated comprises a memory write to a location within the at least one region.

10. The method of claim 9, wherein emulating the instruction to be emulated further comprises the steps of:
    determining whether the instruction to be emulated comprises initiating a memory read of data previously written by redirection to segment S; and
    redirecting the memory read of data to the segment S if the instruction to be emulated comprises the memory read of data previously written by redirection to the segment S.

11. The method of claim 4, wherein emulating the instruction to be emulated comprises the steps of:
    determining whether the instruction to be emulated comprises a branch point;
    storing an untaken destination address of the branch point and a CPU emulator state if the instruction to be emulated comprises a branch point.

12. A method for detecting a computer virus in a target program, the method comprising:
    a first emulation of instructions of the target program to allow the computer virus to decrypt a viral body;
    a determination of at least one region of the target program in which the decrypted viral body is likely to be present;
    a second emulation of instructions of the at least one region of the target program in which the decrypted viral body is likely to be present; and
    an evaluation of suspicious operations observed during the first and the second emulations, to detect the computer virus.

13. The method of claim 12, wherein the first emulation begins at an entry-point instruction of the target program.

14. The method of claim 12, wherein the second emulation begins at an instruction immediately following a last instruction emulated during the first emulation.

15. The method of claim 12, wherein during the first emulation the computer virus does not decrypt the viral body because the viral body is not encrypted; and wherein the second emulation begins at an entry-point instruction of the target program.

16. The method of claim 12, wherein whether the viral body has decrypted is determined by identifying a contiguous section of bytes in memory which were overwritten during the first emulation.

17. In a computer system, a method for detecting computer viruses in a target program comprising the steps of:
    emulation of instructions of the target program;
    evaluation of operations observed during the emulation, to detect computer viruses; and
    stopping the evaluation if an innocent operation is observed and no highly suspicious operation is observed.

18. The method of claim 17, wherein the innocent operation comprises printing or displaying a character.

19. The method of claim 17, wherein the innocent operation comprises a program termination instruction within a particular region of the program.

20. The method of claim 17, wherein the innocent operation comprises a re-vectoring of an error vector.

21. The method of claim 17, wherein the innocent operation comprises calling from within a particular region of the program a function far away from a present location.

22. The method of claim 17, wherein the highly suspicious operation comprises comparing contents of a register or memory location with an identifier of a file header.

23. The method of claim 17, wherein the highly suspicious operation comprises a file write of a similar size in bytes as a number of bytes from an entry-point of the target program to an end-of-file of the target program.

24. The method of claim 17, wherein the highly suspicious operation comprises a seek to an end-of-file followed by a file write of a jump instruction.

25. The method of claim 24, wherein the seek determines a size in bytes and the jump instruction covers a similar number of bytes.

26. The method of claim 17, wherein the highly suspicious operation comprises a file write of a similar size as a size of a header, and the file write includes a tag that is characteristic of the header.

27. The method of claim 17, wherein the highly suspicious operation comprises having a header of an executable file within a body of the target program.

28. The method of claim 17, wherein the highly suspicious operation comprises finding an executable file in a directory.

29. The method of claim 17, wherein the highly suspicious operation comprises examination or modification of a memory allocation scheme.

30. The method of claim 17, wherein the highly suspicious operation comprises one or more move string operations that move approximately a same number of bytes as a number of bytes from an entry-point of the target program to an end-of-file of the target program.

31. A method for detecting a virus in a target program including the step of detecting a presence of an operation comprising a seek to an end-of-file followed by a file write of a jump instruction, wherein the seek determines a size in bytes and the jump instruction covers a similar number of bytes.

* * * * *